(12) United States Patent
Cheng et al.

(10) Patent No.: US 12,528,780 B2
(45) Date of Patent: Jan. 20, 2026

(54) 2-(1,2,4-TRIAZOLYL) BENZOYL ARYLAMINE ACTIVE COMPOUND FOR INHIBITING WHEAT TAKE-ALL PATHOGEN

(71) Applicant: HENAN AGRICULTURAL UNIVERSITY, Zhengzhou (CN)

(72) Inventors: Yinan Cheng, Zhengzhou (CN); Honglian Li, Zhengzhou (CN); Xianru Guo, Zhengzhou (CN); Zhenhua Jiang, Zhengzhou (CN); Ziyang Su, Zhengzhou (CN); Mengmeng Zhang, Zhengzhou (CN); Liansheng Sun, Zhengzhou (CN); Guofu Shen, Zhengzhou (CN); Yichao Ma, Zhengzhou (CN)

(73) Assignee: HENAN AGRICULTURAL UNIVERSITY, Zhengzhou (CN)

( * ) Notice: Subject to any disclaimer, the term of this patent is extended or adjusted under 35 U.S.C. 154(b) by 725 days.

(21) Appl. No.: 17/629,254

(22) PCT Filed: Nov. 16, 2020

(86) PCT No.: PCT/CN2020/129000
§ 371 (c)(1),
(2) Date: Jan. 21, 2022

(87) PCT Pub. No.: WO2021/147484
PCT Pub. Date: Jul. 29, 2021

(65) Prior Publication Data
US 2022/0348550 A1    Nov. 3, 2022

(30) Foreign Application Priority Data
Jan. 20, 2020 (CN) .......... 202010066605.6

(51) Int. Cl.
C07D 249/08 (2006.01)
A01N 43/653 (2006.01)
A01P 3/00 (2006.01)

(52) U.S. Cl.
CPC ......... *C07D 249/08* (2013.01); *A01N 43/653* (2013.01); *A01P 3/00* (2021.08)

(58) Field of Classification Search
CPC .................................. C07D 249/08
See application file for complete search history.

(56) References Cited

U.S. PATENT DOCUMENTS

| | | |
|---|---|---|
| 5,482,974 A | 1/1996 | Phillion et al. |
| 5,486,621 A | 1/1996 | Phillion et al. |
| 5,994,270 A | 11/1999 | Phillion et al. |
| 6,028,101 A | 2/2000 | Phillion et al. |
| 9,227,923 B2 * | 1/2016 | Mihara ................. C07C 237/40 |

FOREIGN PATENT DOCUMENTS

| | | | |
|---|---|---|---|
| CN | 111187227 B | 10/2020 | |
| WO | 9420473 A1 | 9/1994 | |
| WO | 9506035 A1 | 3/1995 | |
| WO | WO-9804532 A1 * | 2/1998 | ........... A01N 43/653 |
| WO | 2016/168059 A1 | 10/2016 | |

OTHER PUBLICATIONS

Bartlett "Exploiting Chemical Diversity for Drug Discovery" Edited by Paul A Bartlett and Michael Entzeroth, The Royal Society of Chemistry, 2006, pp. 113-118.*
"Find ETDs Home » Thesis Resources » Find ETDs" Online: "https://ndltd. org/thesis-resources/find-etds/" Accessed Jan. 31, 2023.*
Irwin "ZINC—A Free Database of Commercially Available Compounds for Virtual Screening" J. Chem. Inf. Model. 2005, 45, 177-182.*
Kim "PubChem in 2021: new data content and improved web interfaces" Nucleic Acids Research, 2021, vol. 49, Database issue Published online Nov. 5, 2020.*
STN Registry/Zregistry (CAS Registrysm) Sep. 2016 2 pages.*
Cheng, European Journal of Medicinal Chemistry (2020), 200, 112463.*
Aurora Fine Chemicals, Aurora Building Blocks: https://aurorafinechemicals.com/.
Notification to Grant Patent Right for Invention for related Chinese Patent Application, serial No. 202010066605.6.
International Search Report dated Jan. 18, 2021 for International Patent Application No. PCT/CN 2020/129000.
First Office Action dated Jul. 20, 2020 for related Chinese Patent Application No. 202010066605.6.
N. Strushkevich et al., "Structural Basis of Human CYP51 Inhibition by Antifungal Azoles", JMB, Science Direct, Feb. 10, 2010, pp. 1067-1078, www.sciencedirect.com.

* cited by examiner

*Primary Examiner* — Nizal S Chandrakumar (57) ABSTRACT

Disclosed in the present invention are a 2-(1,2,4-triazolyl) benzoyl arylamine active compound for inhibiting a wheat take-all pathogen, and a preparation method therefor. The active compound has a structure as shown in formula I. R1, R3, and R4 are —H, —F, —Cl, —Br, —I, —CN, —NO2, —CF3, —CHO, —C1-C4 alkyl groups, or —C1-C4 haloalkyl groups, or —O—R5; R2 is —H, —F, —Cl, —Br, —I, —CN, —CF3, —CHO, —C1-C4 alkyl groups, or —C1-C4 haloalkyl groups, or —O—R5; X is —F, —Cl, —Br, —I, —CN, —NO2, —CF3, or —COOR6; Y is —H, —F, —Cl, —Br, —I, —CN, —NO2, —CF3, or —COOR6; R5 is —C1-C4 alkyl groups, or —C1-C4 haloalkyl groups; R6 is —C1-C4 alkyl groups, or —C1-C4 haloalkyl groups. The compound I has an excellent inhibition effect on the wheat take-all pathogen and can be applied to prevention and treatment of wheat take-all.

5 Claims, 6 Drawing Sheets

Fig. 1

| Examples | Compounds' Structure | 1H NMR (400 Hz, DMSO-d) δ (ppm) | M.P. (°C) |
|---|---|---|---|
| 2 | | 10.84(s, 1H), 8.95(s, 1H), 8.17(s, 1H), 7.78~7.70(m, 4H), 7.39~7.33(m, 2H), 7.18~7.16(m, 1H). | 176~177 |
| 3 | | 10.88(s, 1H), 8.94(s, 1H), 8.17(s, 1H), 7.78~7.69(m, 3H), 7.53~7.26(m, 3H), 6.97~6.92(m, 1H). | 165~166 |
| 4 | | 10.69(s, 1H), 8.91(s, 1H), 8.17(s, 1H), 7.77~7.68(m, 3H), 7.57~7.53(m, 2H), 7.19~7.15(m, 2H) | 134~135 |
| 5 | | 10.68(s, 1H), 8.91(s, 1H), 8.20(s, 1H), 7.78~7.67(m, 3H), 7.56~7.54(m, 2H), 7.40~7.36(m, 2H), 7.14~6.98(m, 5H). | 65~67 |
| 6 | | 11.27(s, 1H), 9.01(s, 1H), 8.25~8.23(m, 2H), 8.14(s, 1H), 7.81~7.73(m, 3H). | 174~175 |
| 7 | | 10.99(s, 1H), 8.96(s, 1H), 8.15(s, 1H), 7.95~7.92(d, J=8.8 Hz, 2H), 7.78~7.68(m, 3H), 3.83(s, 3H). | 201~202 |
| 8 | | 11.01(s, 1H), 8.97(s, 1H), 8.15(s, 1H), 7.78~7.69(m, 7H). | 73~74 |
| 9 | | 10.77(s, 1H), 8.92(s, 1H), 8.15(s, 1H), 7.77~7.67(m, 3H), 7.51(s, 4H). | 140~141 |

FIG. 1 (Continued)

| 10 |  | 10.96(s, 1H), 8.97(s, 1H), 8.16(s, 1H), 7.92~7.91(d, J=2.4 Hz, 1H), 7.79~7.71(m, 3H), 7.60~7.58(d, J=8.8 Hz, 1H), 7.45~7.42(dd, J=2.4 Hz, J=8.8 Hz, 1H). | 168~169 |
| 11 |  | 10.60(s, 1H), 8.91(s, 1H), 8.19(s, 1H), 7.79~7.66(m, 4H), 7.51~7.48(dd, J=10.4 Hz, J=2.4 Hz, 1H), 7.31~7.28(m, 1H). | 169~170 |
| 12 |  | 10.88(s, 1H), 8.96(s, 1H), 8.18(s, 1H), 7.86~7.84(dd, J=6.8 Hz, J=2.4 Hz, 1H), 7.78~7.69(m, 3H), 7.45~7.37(m, 2H). | 63~64 |
| 13 |  | 11.11(s, 1H), 9.00(s, 1H), 8.15(s, 1H), 8.12~8.11(d, J=2.4 Hz, 1H), 7.80~7.69(m, 5H). | 67~68 |
| 14 |  | 11.10(s, 1H), 9.00(s, 1H), 8.15(s, 1H), 8.11~8.10(d, J=2.4 Hz, 1H), 7.86~7.69(m, 5H). | 75~77 |
| 15 |  | 11.21(s, 1H), 9.03(s, 1H), 8.16(s, 1H), 7.97~7.96(J=1.6 Hz, 1H), 7.84~7.71(m, 4H), 7.63~7.61(dd, J=8.4 Hz, J=1.6 Hz, 1H). | 76~78 |
| 16 |  | 11.19(s, 1H), 9.03(s, 1H), 8.16(s, 1H), 8.14~8.13(d, J=2 Hz, 1H), 7.83~7.65(m, 5H). | 73~74 |
| 17 |  | 10.94(s, 1H), 8.97(s, 1H), 8.16(s, 1H), 8.06~8.05(d, J=2.4 Hz, 1H), 7.78~7.69(m, 3H), 7.59~7.57(d, J=8.8 Hz, 1H), 7.49~7.46(dd, J=8.8 Hz, J=2.4 Hz, 1H). | 163~164 |
| 18 |  | 10.95(s, 1H), 8.97(s, 1H), 8.16(s, 1H), 7.92~7.91(d, J=2.4 Hz, 1H), 7.78~7.69(m, 4H), 7.38~7.35(dd, J=8.8 Hz, J=2.4 Hz, 1H). | 167~169 |

FIG. 1 (Continued)

| 19 | *(structure)* | 10.95(s, 1H), 8.96(s, 1H), 8.13(s, 1H), 7.87~7.85(d, J=8.4 Hz, 2H), 7.78~7.64(m, 5H), 1.54(s, 9H). | 96~97 |
|---|---|---|---|
| 20 | *(structure)* | 11.11(s, 1H), 9.00(s, 1H), 8.16(s, 1H), 7.87~7.85(d, J=8.8 Hz, 2H), 7.85~7.70(m, 3H), 7.55~7.52(dd, J=8.2 Hz, J=2.0 Hz, 1H), 3.84(s, 3H). | 77~78 |
| 21 | *(structure)* | 11.07(s,1H ), 8.97(s, 1H), 8.14(s,1H), 7.99~7.97(d, J=8.8 Hz, 2H), 7.78~7.73(m, 5H), 5.02~4.95(q, J= 8.8 Hz, 2H). | 175~176 |
| 22 | *(structure)* | 10.98(s, 1H), 8.96(s,1H), 8.14(s,1H), 7.93~7.90(d, J=8.8 Hz, 2H), 7.78~7.67(m, 5H), 5.15~5.09(m, 1H), 1.32~1.30(d, J= 6.4 Hz, 6H). | 167~168 |
| 23 | *(structure)* | 10.99(s, 1H), 8.96(s, 1H), 8.15(s, 1H), 7.95~7.92(d, J=8.4 Hz, 2H), 7.78~7.68(m, 5H), 4.33~4.28(q, J=7.2 Hz, 2H), 1.34~1.30(t, J=7.2 Hz, 3H). | 76~78 |

Fig. 2

| Examples | Compounds' structure | 1H NMR (400 Hz, DMSO-d6) δ (ppm) | M.P. (°C) |
|---|---|---|---|
| 24 | | 10.70(s, 1H), 8.94(s, 1H), 8.10 (s, 1H), 7.91~7.87(d, J=8.8Hz, 2H), 7.77~7.64(m, 6H), 5.15~5.08(m, 1H), 1.32~1.31(d, J=6.0Hz, 6H). | 190~192 |
| 25 | | 10.78(s, 1H), 8.90(s, 1H), 8.16 (s, 1H), 7.94~7.88(m, 3H), 7.81~7.73(m, 2H), 7.66~7.63(d, J=8.4Hz, 2H), 5.14~5.08(m, 1H), 1.32~1.30(d, J=6.4Hz, 6H). | 208~209 |

Fig. 3

| Compounds of Examples | EC₅₀ (mg/L) |
|---|---|
| 1 | 0.31 |
| 2 | 3.81 |
| 3 | 12.43 |
| 4 | 4.32 |
| 5 | 6.62 |
| 6 | 0.28 |
| 7 | 0.06 |
| 8 | 0.24 |
| 9 | 0.17 |
| 10 | 0.05 |
| 11 | 10.59 |
| 12 | 0.44 |
| 13 | 0.49 |
| 14 | 0.79 |
| 15 | 0.19 |
| 16 | 0.38 |
| 17 | 0.35 |
| 18 | 0.20 |
| 19 | 0.02 |
| 20 | 0.18 |
| 21 | 0.24 |
| 22 | 0.008 |
| 23 | 0.04 |
| 24 | 0.24 |
| 25 | 0.23 |
| silthiopham | 21.3 |
| prothioconazole | 0.28 |

Fig. 4

| Comparative Examples | Structures of Comparative Examples | 1H NMR (400 Hz, DMSO-d) δ (ppm) | Mp (°C) | ED₉₀ (mg/L) |
|---|---|---|---|---|
| 1 | (structure) | 1H NMR (400 MHz, CDCl₃) δ: 8.44 (s, 1H), 8.02 (s, 1H), 7.48-7.42 (m, 3H), 5.79 (brs, 1H), 5.72-5.62 (m, 1H), 5.09-5.05 (m, 2H), 3.89-3.86 (t, J=6Hz, 2H). | 130~131 | > 500 |
| 2 | (structure) | 1H NMR (400 MHz, CDCl₃) δ: 8.60 (s, 1H), 8.07 (s, 1H), 7.54-7.47 (m, 3H), 3.50-3.43 (m, 2H), 3.09-2.93 (m, 2H), 1.13-1.10 (t, J=6.8 Hz, 3H), 0.89-0.85 (t, J=7.2 Hz, 3H). | 135~137 | > 500 |
| 3 | (structure) | 1H NMR (400 MHz, CDCl₃) δ: 8.35 (s, 1H), 7.85 (s, 1H), 7.48-7.39 (m, 3H), 7.32-7.22 (m, 4H), 6.83-6.80 (t, J=5.8 Hz, 1H), 4.56-4.54 (d, J=6 Hz, 2H). | 143~146 | > 500 |

2-(1,2,4-TRIAZOLYL) BENZOYL ARYLAMINE ACTIVE COMPOUND FOR INHIBITING WHEAT TAKE-ALL PATHOGEN

TECHNICAL FIELD

The disclosure relates to the field of compounds for the prevention and control of crop diseases and insect pests, more specifically, relates to a new 2-(1,2,4-triazole) benzoyl arylamine compound as fungicides and a preparation method thereof, and a composition containing the compound is used to prevent and control wheat take-all disease.

BACKGROUND ART

With the development of society, especially with the continuous progress of science and technology, the development of social productivity has been greatly promoted; and people's lives have also been greatly improved, more specially, the development of new agriculture driven by the process of industrialization makes our country's agriculture more modern, and the agricultural farming model is also undergoing tremendous changes.

Straw returning has become the main operation mode of agriculture. Since plant stalks have the characteristics of breeding and carrying pathogenic bacteria, straw returning will increase the risk and degree of crop diseases to some extent. Therefore, the prevention and control of crop diseases and the development of new fungicides for controlling crop diseases have become very important in the process of agricultural modernization. The literature "Pesticide", 2008, 47(1), 6-7, 20 reported the application of amide compounds in the agricultural field; the literature *J. Mol. Biol.*, 2010, 397, 1067-1078 reported different application fields of the triazole active compounds, the compounds disclosed in the above documents can meet the requirements for the prevention and control of specific crops and specific diseases in the agricultural field to a certain extent. However, for the prevention and control of wheat take-all disease, there are few varieties available for selection due to the limited control effect. U.S. Pat. Nos. 5,482,974A, 6,028,101A, 5,994,270A and World Patent WO9307751A1 disclose a series of active compounds for controlling wheat take-all disease, but only the Silthiopham compounds disclosed in U.S. Pat. No. 5,486,621A are commercially available, and are used for the prevention and control of wheat take-all disease. However, with the continuous development of disease resistance levels in crops, some fungicides including Silthiopham have even developed resistance.

Therefore, it is particularly necessary to provide a new active compound for the prevention and control of wheat take-all disease and to develop a new fungicide.

DISCLOSURE

In order to solve the above-mentioned deficiencies in the prior art, the disclosure provides a 2-(1,2,4-triazole) benzoyl arylamine active compound for fungicide and a preparation method thereof, in which the active compound has an excellent inhibitory against *Gaeumannomyces graminis* var *tritici*, i.e., wheat take-all pathogen, has raw materials cheap and easy to be synthesized, does not involve air-sensitive compounds, has a smooth, simple, and safe synthesis process, and has an easily purified product.

The purpose of the disclosure is achieved as follows.

The disclosure provides a 2-(1,2,4-triazole) benzoyl arylamine active compound for inhibiting wheat take-all pathogen having a structure shown in formula I:

I

Where, $R^1$, $R^2$, $R^3$, and $R^4$ are —H, —F, —Cl, —Br, —I, —CN, —NO$_2$, —CF$_3$, —CHO, —C$_1$-C$_4$ alkyl group or —C$_1$-C$_4$ haloalkyl group or —O—R$^5$.

X and Y are —H, —F, —Cl, —Br, —I, —CN, —NO$_2$, —CF$_3$ or —COOR$^6$.

$R^5$ is —C$_1$-C$_4$ alkyl group or —C$_1$-C$_4$ haloalkyl group or aryl group.

$R^6$ is —C$_1$-C$_4$ alkyl group or —C$_1$-C$_4$ haloalkyl group or aryl group.

A preparation method of 2-(1,2,4-triazole) benzoyl arylamine active compound for inhibiting wheat take-all pathogen, wherein the active compound is synthesized in the following method:

VI

V

IV

-continued

Compound I can be obtained by condensation of an intermediate II and a substituted aniline III in a set reaction condition A, as shown in a reaction formula 1:

Reaction formula 1

The reaction condition A is as follows: in a presence of a chlorinating agent including SOCl$_2$, PCl$_3$, POCl$_3$, PCl or oxalyl chloride, in a solvent including toluene, N,N-dimethylformamide, ethyl acetate, THF or acetonitrile, the intermediate II is converted into a corresponding acyl chloride at −10° C. to a reflux temperature, and then reacts with the substituted aniline III at room temperature to a reflux temperature for 0.5~10 hours in a presence of a catalyst including triethylamine, pyridine, sodium hydroxide, potassium hydroxide, sodium carbonate, potassium carbonate, sodium acetate or potassium acetate;

Or in a presence of a condensing agent including dicyclohexylcarbodiimide (DCC), diisopropyl Carbodiimide (DIC) or 1-(3-dimethylaminopropyl)-3-ethylcarbodiimide (EDCI), in a solvent including toluene, N,N-dimethylformamide, ethyl acetate, THF or acetonitrile, the intermediate II and the substituted aniline III react at −10° C. to a reflux temperature for 1~15 hours with/without a catalyst including 1-hydroxybenzotriazole (HOBt), 4-dimethylaminopyridine (DMAP), N-hydroxy-7-azabenzotriazole (HOAt).

In the reaction of the reaction formula 1, the molar ratio of the intermediate II to the intermediate III and the condensing agent is 1:0.8~5:0.8~4, and the amount of the catalyst relative to the intermediate II is 0-200% by mole.

The intermediate II can be formed by a hydrolysis of intermediate IV at a set reaction condition B, as shown in a reaction formula 2:

Reaction formula 2

The reaction condition B is as follows: under the action of a set ratio of sulfuric acid and nitrous acid, an intermediate IV with water as a solvent reacts at −10° C. to 20° C. for 1 to 12 hours, and then reacts at a reflux temperature for 1 to 8 hours.

In a reaction of the reaction formula 2, the molar ratio of the intermediate IV to sulfuric acid and nitrous acid is 1:5~15:2~8.

The intermediate IV is obtained by hydrolysis of an intermediate V under a set condition C, as shown in a reaction formula 3:

Reaction formula 3

The reaction condition C is as follows: an intermediate V reacts in an aqueous solution of sulfuric acid with a predetermined concentration at 50° C. to a reflux temperature with atmospheric pressure for 5~25 hours.

In a reaction of the reaction formula 3, a mass concentration of sulfuric acid is 50-85%; a molar ratio of the intermediate V to sulfuric acid is 1:5~10.

A compound V is obtained by catalytic coupling from a raw material VI and 1,2,4-triazole under a set condition D, as shown in reaction formula 4.

Reaction formula 4

The reaction condition D is as follows: in a presence of 1-10% molar equivalents of CuI and 8-hydroxyquinoline-N-oxide as catalysts, the raw material VI and 1,2,4-triazole in a solvent including toluene, dimethyl sulfoxide (DMSO) or N,N-dimethylformamide (DMF), with 1~3 molar equivalents of alkali metal carbonates including sodium carbonate, potassium carbonate or cesium carbonate as bases, react at 50° C.~130° C. for 5-18 hours.

In the reaction formula 4, the molar ratio of the raw material VI and 1,2,4-triazole is 1:0.8~3.

A composition containing the compound I is applied to the prevention and control of crop diseases.

The advantageous effects are as follows. (1) The compound of the disclosure has an excellent inhibitory effect on wheat take-all pathogen, and its activity against the tested pathogen significantly exceeds that of the specific fungicide Silthiopham for controlling wheat take-all disease, so it can be used for effectively control wheat take-all disease and ensure the safety of wheat production, and provide alternative methods, measures and options for the prevention and control of wheat take-all disease; and (2) the compound of the disclosure has cheap raw materials easy to be synthesized, does not involve air-sensitive compounds, has a smooth, simple, and safe synthesis process, is purified easily, and has a relatively lower production cost than that of Silthiopham, which is easy for spread and application.

BEST MODE

Hereinafter, the disclosure will be further explained in combination with specific examples:

Example 1

2-Chloro-N-(4-chlorophenyl)-6-(1H-1,2,4-triazol-1-yl)benzamide
2-chloro-N-(4-chlorophenyl)-6-(1H-1,2,4-triazol-1-yl)benzamide Step 1, 0.17 g (1 mmol) of 2,6-dichlorobenzonitrile, 0.09 g (1.3 mmol) of technical grade 1,2,4-triazole, 0.43 g (1.3 mmol) of anhydrous cesium carbonate and 9.5 mg (0.05 mmol) of CuI and 8.1 mg (0.05 mmol) of 8-hydroxyquinoline-N-oxide ligand were added to a 20 mL small reaction flask, and then 3 mL of N,N-dimethylformamide was measured and added to the reaction flask to be stirred, heated and reacted in an oil bath at 85° C. for 12 hours. After the completion of the reaction through TLC, potassium carbonate and unreacted triazole were filtered under reduced pressure, the filtrate was washed with water, extracted and concentrated, and separated by thin-layer chromatography to obtain 133 mg of sub-white solids. 2-Chloro-6-(1H-1,2,4-triazol-1-yl) benzonitrile, sub-white solid, melting point: 170° C.-172° C., yield: 65%. $^1$H NMR (400 MHz, CDCl$_3$) δ: 8.79 (s, 1H), 8.20 (s, 1H), 7.72-7.70 (dd, J=4 Hz, 2H), 7.64-7.62 (m, 1H). $^{13}$C NMR (100 MHz, CDCl$_3$) δ: 153.3, 143.3, 140.3, 139.2, 134.5, 129.8, 123.1, 113.3, 107.7.

Step 2, 6.1 g (30 mmol) of 2-chloro-6-(1H-1,2,4-triazol-1-yl) benzonitrile was added into a three-necked flask, and then 30 g of 80% sulfuric acid (0.24 mol) aqueous solution was added, the mixture was heated to 100° C. to react at the reflux condition for 18 hours, in which the mixture was a dark red homogeneous solution during the reaction. After the completion of the reaction through TLC, water was added to adjust the pH to neutral, then the resultant was extracted with ethyl acetate and dried, the solvent was evaporated under reduced pressure to obtain gray solids as a crude product, and the crude product was separated by column chromatography to obtain 5.3 g of pure 2-chloro-6-(1H-1,2,4-triazol-1-yl) benzamide. 2-Chloro-6-(1H-1,2,4-triazol-1-yl) benzamide, gray solid, melting point: 128° C.-130° C., yield: 79%. $^1$H NMR (400 MHz, CDCl$_3$) δ: 8.52 (s, 1H), 8.11 (s, 1H), 7.58-7.56 (m, 1H), 7.53-7.49 (m, 2H), 5.86 (brs, 2H). $^{13}$C NMR (100 MHz, CDCl$_3$) δ: 165.7, 152.7, 144.2, 135.2, 132.1, 131.5, 131.1, 130.5, 124.0.

Step 3, 14.3 g (0.064 mol) of 2-chloro-6-(1H-1,2,4-triazol-1-yl) benzamide was added into a 100 mL of a three-necked reaction flask, the three-necked flask was placed in an ice bath, 79 g of 80% sulfuric acid (0.64 mol) aqueous solution was slowly added at 0° C.~10° C., 22.1 g (0.32 mol) of sodium nitrite aqueous solution which has been cooled to 0° C.~10° C. was added dropwise. The reaction is maintained between 0° C.~10° C. After the dripping of sodium nitrite, the reaction is remained for 1 h, and then the resultant is reacted at 100° C. for 2 h until the reaction is complete through TLC. The reaction solution is extracted with ethyl acetate, dried, and distilled under reduced pressure to distill the solvent off, and then 12 g of pale yellow 2-chloro-6-(1H-1,2,4-triazol-1-yl) benzoic acid solid was obtained. 2-Chloro-6-(1H-1,2,4-triazol-1-yl)benzoic acid, yellow solid, melting point: 122° C.-124° C. Yield: 84%. $^1$H NMR (400 MHz, CDCl$_3$) δ: 9.03 (s, 1H), 8.26 (s, 1H), 7.74-7.64 (m, 3H). $^{13}$C NMR (100 MHz, CDCl$_3$) δ: 165.7, 152.9, 144.9, 135.0, 131.7, 131.2, 130.4, 130.3, 123.6.

Step 4, 1.4 g (6.3 mmol) of 2-chloro-6-(1H-1,2,4-triazol-1-yl) benzoic acid was put into a 50 mL of a three-necked reaction flask containing 20 mL of toluene with reflux and gas absorption devices, 1.5 g (12.6 mmol) of thionyl chloride was slowly added at 80° C., and the reaction is remained for 2 h after the addition. After the solvent and excess thionyl chloride are removed under negative pressure, 10 mL of fresh toluene was added to the reaction flask, and then 10 mL toluene solution containing 2.4 g (18.9 mmol) of p-chloroaniline and 0.64 g (6.3 mmol) of triethylamine was dropwise added into the reaction flask, and then the reaction was remained at 85° C. for 2 hours. The saturated brine was added to wash, the mixture was stood to separate layers, the organic phase was washed with warm water (5 mL each time) three times, dried with the desiccant, and then filtered, the filtrate was distilled under negative pressure to distill the solvent off, and the resultant was separated through a chromatographic column or recrystallization to obtain 2-chloro-N-(4-chlorophenyl)-6-(1H-1,2,4-triazol-1-yl) benzamide compound, pale yellow solids. Melting point: 136.4° C.-137.9° C., yield: 63%. $^1$H NMR (400 Hz, DMSO-d) δ (ppm): 10.79 (s, 1H), 8.93 (s, 1H), 8.16 (s, 1H), 7.77-7.68 (m, 3H), 7.58-7.56 (d, J=8.8 Hz, 2H), 7.39-7.37 (d, J=8.8 Hz, 2H).

Examples 2-23

Figure 1:
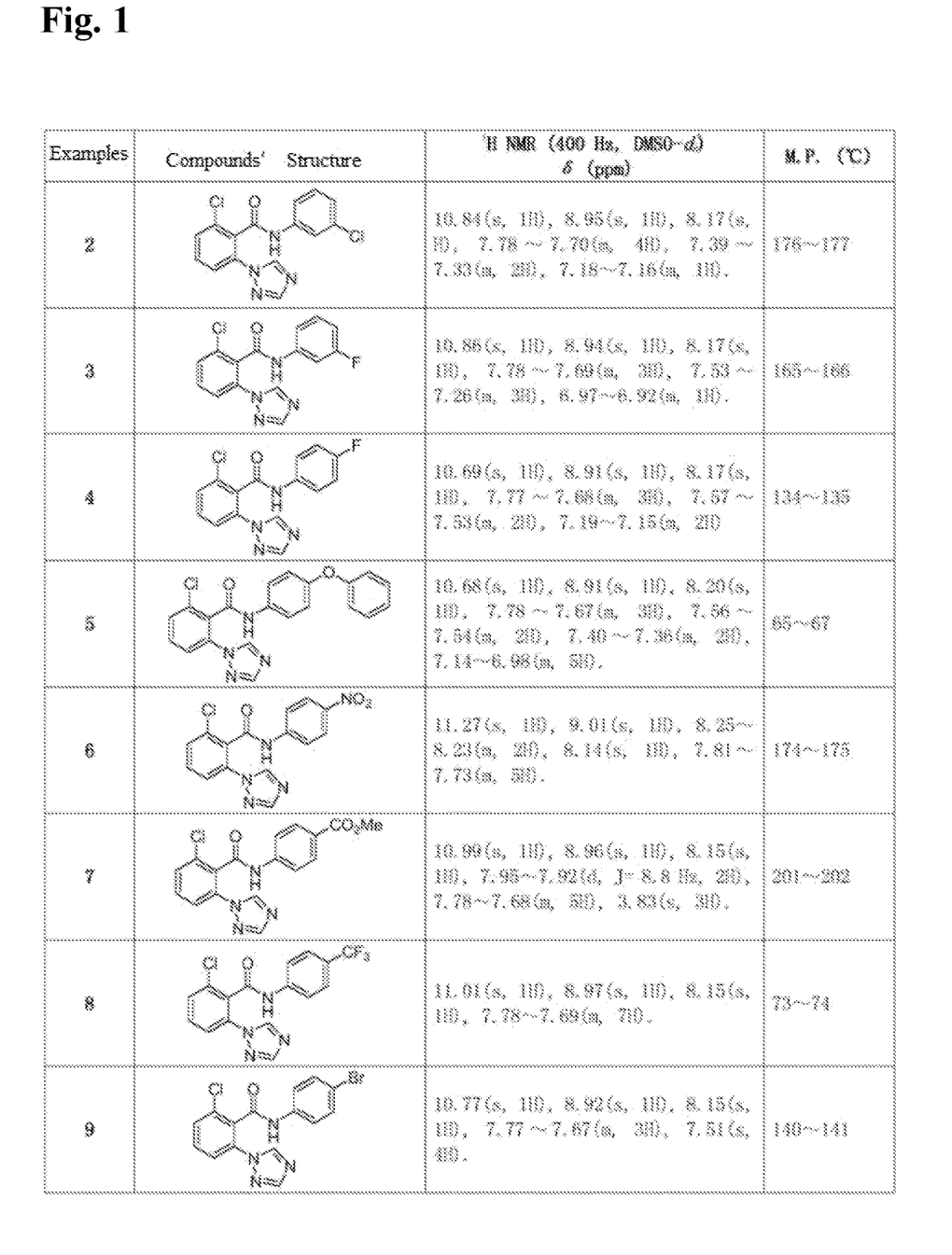
FIG. 1 is a characterization data table of the structure and physical and chemical parameters of the compounds of Examples 2-23.

The compounds was synthesized in the same way as in Example 1. The intermediate 2-chloro-6-(1H-1,2,4-triazol-1-yl) benzoic acid synthesized in Example 1 as a raw material, was reacted with different substituted anilines to synthesize and separate the compounds. The structure, some physical and chemical parameters and characterization data of the compounds are shown in FIG. 1.

Examples 24-25

Figure 2:
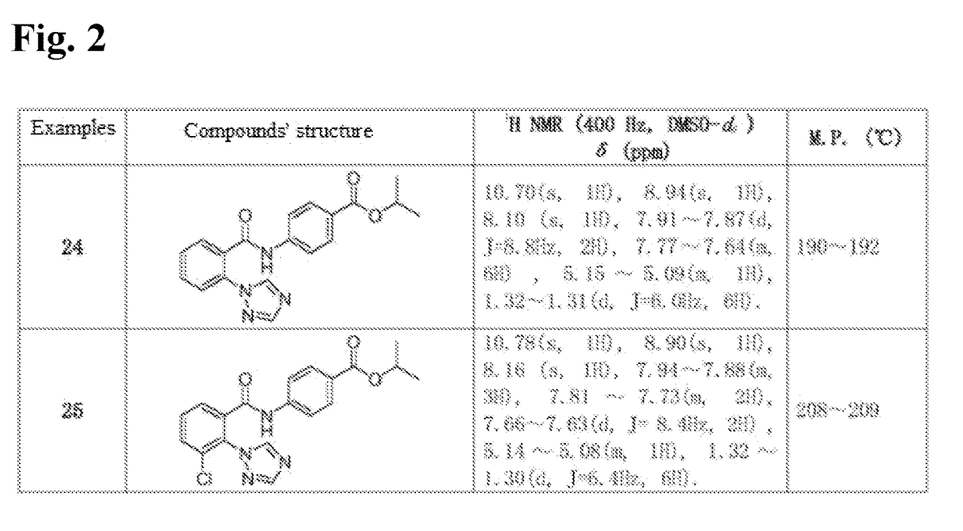
FIG. 2 is a characterization data table of the structure and physical and chemical parameters of the compounds of Examples 24-25.

2-chlorobenzonitrile and 2,3-dichlorobenzonitrile were used as raw materials respectively, the corresponding 2-(1H-1,2,4-triazol-1-yl) benzonitrile and 3-chloro-2-(1H-1,2,4-triazol-1-yl) benzonitrile were synthesized according to the same method as step 1 in Example 1; then the corresponding 2-(1H-1,2,4-triazol-1-yl) benzonitrile and 3-chloro-2-(1H-1,2,4-triazol-1-yl) benzonitrile as intermediates were hydrolyzed according to the same methods as steps 2, 3 in Example 1 to obtain 2-(1H-1,2,4-triazol-1-yl) benzoic acid and 3-chloro-2-(1H-1,2,4-triazol-1-yl) benzoic acid respectively; and according to the same method as step 4 in Example 1, the obtained acids were condensed with isopropyl 4-aminobenzoate to obtain the target compounds. The structure, some physical and chemical parameters and characterization data of the compound are shown in FIG. 2.

Activity Test of Compounds of Examples 1-25

The biological activity of the compounds were tested by the mycelial growth rate method. The tested pathogen was wheat take-all disease, which was isolated and purified from Zhumadian, Henan Province. Firstly, 200 g of peeled fresh potatoes were weighed, boiled with 1 L of distilled water for 20 minutes, the uncooked potatoes were filtered out with gauze, the filtrate was added with 20 g of glucose and 15 g of agar, stirred well until thoroughly dissolved, diluted with distilled water to 1 L, then was sterilized by moist heat at 120° C. for 20 minutes, and was cooled to prepare a PDA medium.

Then, each of test samples of appropriate concentration was prepared with dimethyl sulfoxide (DMSO) as the solvent, and added with an appropriate amount of surfactant Tween for use. 1 mL of each of the test sample solutions of appropriate concentration was pipetted and thoroughly mixed with 9 mL of PDA medium melted and cooled to 50° C., then the mixture was poured into a sterile petri dish and cooled to room temperature. A fungi cake was made of the pathogen of wheat take-all disease cultivated on the PDA plate for 7 days through a 5 mm diameter puncher, then was inoculated in the center of the medicated PDA plate in an inverted manner, and the non-medicated plate medium was used as a control. Each agent was set to include six concentrations of 100, 50, 10, 1, 0.1, 0.01 μg/mL, and each of six concentrations was set to include 3 replicates, each of replicates was incubated in a 25° C. incubator in the dark for 6 days, then the diameter of each of the colonies was measured and the relative inhibition rate of each of the concentrations was calculated ([Relative inhibition rate= (blank control colony growth diameter-agent treatment colony growth diameter)/blank control colony growth diameter×100%], and the log value of the concentration and the probability value of the relative inhibition rate are fitted to the regression virulence equation, thereby obtaining the $EC_{50}$ value. The $EC_{50}$ values calculated by the activity test of the compounds of the examples are shown in FIG. 3.

Figure 3:
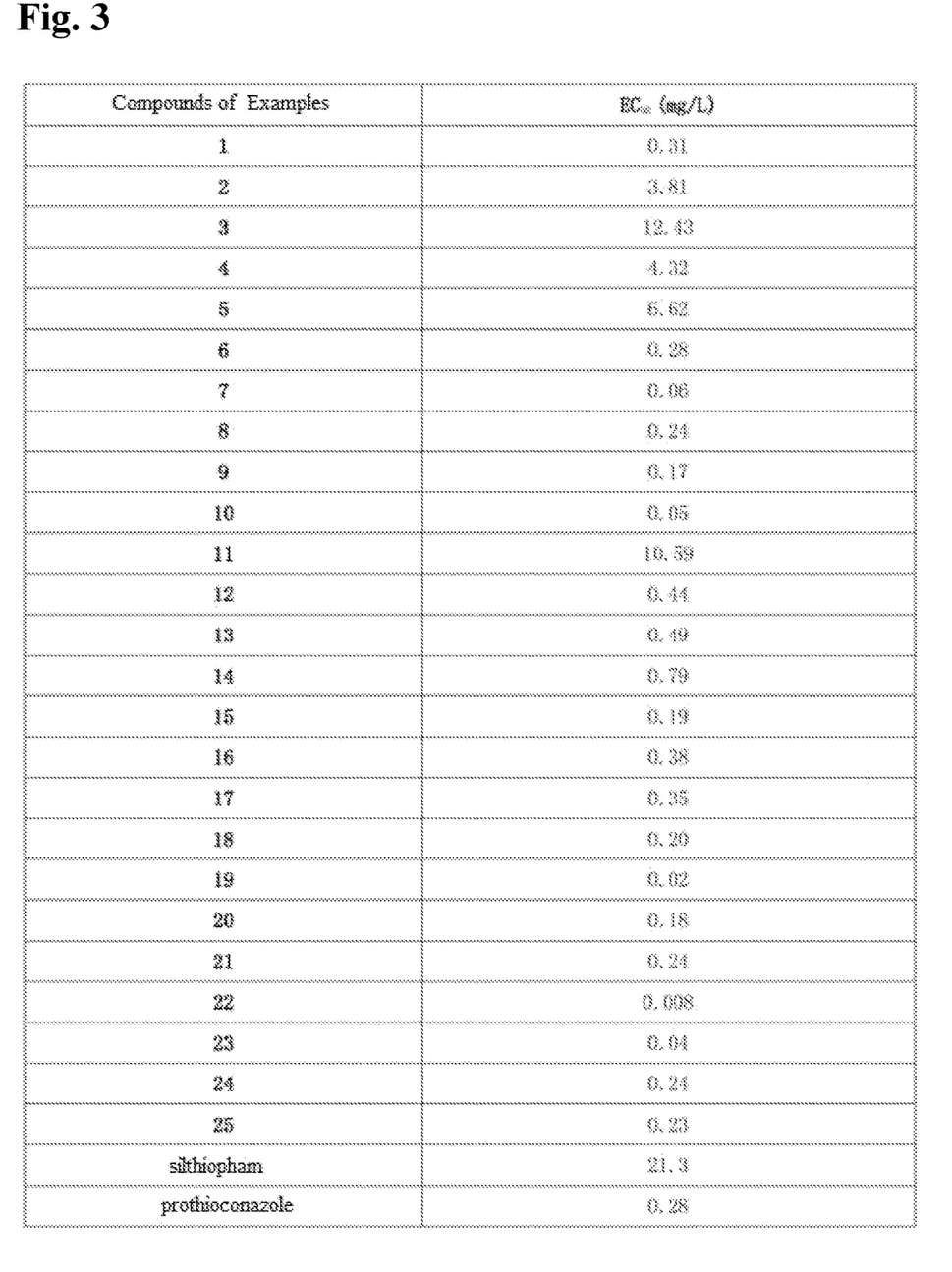
FIG. 3 is a table showing the inhibitory activity of compounds of Examples 1-25 on wheat take-all disease.

The data in FIG. 3 shows that the compounds of the disclosure have high virulence to the pathogen of wheat take-all disease, and the $EC_{50}$ value is significantly better than that of the control agent of Silthiopham; the $EC_{50}$ value of some compounds is close to or lower than that of the newly registered fungicide prothioconazole in China, showing excellent inhibitory activity against wheat take-all disease.

Comparative Examples 1 to 3

Figure 4:
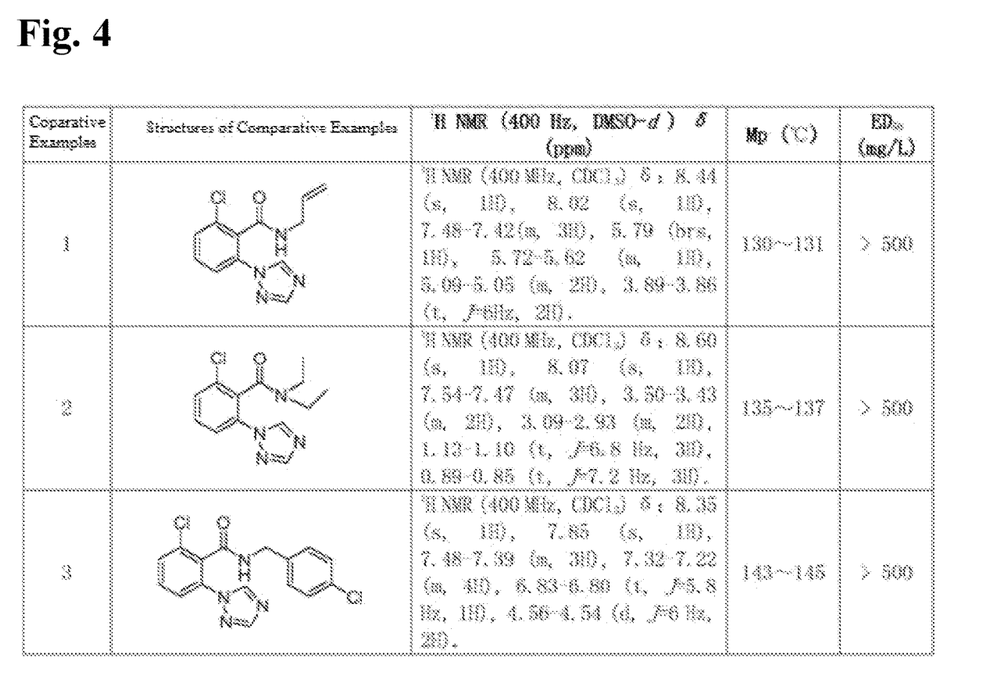
FIG. 4 is a characterization data table of the structure and physical and chemical parameters of the compounds of Comparative Examples 1-3.

For comparison, if the nitrogen atom substituent of the amide of the compound of the disclosure is not an aromatic substituent, and the nitrogen atom of the amide is substituted by 1 or 2 saturated carbon atom substituents, the compound has a poor activity against wheat take-all disease, and shows almost no activity at the tested concentration. The structure, some physical property parameters and EC50 value of the compound of each of the comparative examples is shown in FIG. 4:

The compounds of the disclosure have two advantages: (1) they have an excellent inhibitory effect against wheat take-all pathogen, and activities on the tested pathogen significantly exceeds that of the specific agent silthiopham for the prevention and control of wheat take-all disease, and provide alternative methods, measures and options for the prevention and control of wheat take-all disease; and (2) the compounds of the disclosure have cheap raw materials easy to be synthesized, do not involve air-sensitive compounds, have a smooth, simple, and safe synthesis process, are purified easily, and have a relatively lower production cost than that of Silthiopham, which is easy for spread and application.

The invention claimed is:

1. A 2-(1,2,4-triazole) benzoyl arylamine active compound for inhibiting wheat take-all pathogen having a structure shown in formula I:

wherein, $R^1$, $R^3$, and $R^4$ are —H, —F, —Cl, —Br, —I, —CN, —NO$_2$, —CF$_3$, —CHO, —C$_1$-C$_4$ alkyl group or —C$_1$-C$_4$ haloalkyl group or —O—R$^5$;

$R^2$ is —H, —F, —Cl, —Br, —I, —CN, —CF$_3$, —CHO, —C$_1$-C$_4$ alkyl group or —C$_1$-C$_4$ haloalkyl group or —O—R$^5$;

X is —F, —Cl, —Br, —I, —CN, —NO$_2$, —CF$_3$ or —COOR$_6$; Y is —H, —F, —Cl, —Br, —I, —CN, —NO$_2$, —CF$_3$ or —COOR$_6$;

$R^5$ is —C$_1$-C$_4$ alkyl group or —C$_1$-C$_4$ haloalkyl group; and $R^6$ is —C$_1$-C$_4$ alkyl group or —C$_1$-C$_4$ haloalkyl group.

2. An active compound as fungicide of claim 1, wherein a bactericide formed by a component of the active compound and an agronomically acceptable carrier or a bactericide formed by the component of the active compound, other bactericidal active component and an agronomically acceptable carrier is applied to prevention and control of crop diseases.

3. A method for preventing or controlling wheat take-all disease, the method comprising applying a composition comprising the active compound of claim 1 to a wheat plant or its surrounding environment, wherein the active compound functions as a fungicide.

4. The method of claim 3, wherein the composition comprises a fungicide formed by (i) the active compound and an agronomically acceptable carrier or (ii) the active compound, at least one additional antifungal active component, and an agronomically acceptable carrier, and the fungicide is applied to prevent or control crop diseases.

5. The method of claim 4, wherein the crop disease comprises at least one of fungal blight, leaf spot, or soft rot, and the fungicidal composition is applied by foliar spraying.

* * * * *